United States Patent [19]

Yoshimura et al.

[11] Patent Number: 5,036,420
[45] Date of Patent: Jul. 30, 1991

[54] SURGE ABSORBER

[75] Inventors: Toru Yoshimura; Akio Uchida; Takaaki Ito; Nobuya Saruwatari, all of Saitama, Japan

[73] Assignee: Mitsubishi Mining & Cement Co., Ltd., Tokyo, Japan

[21] Appl. No.: 387,595

[22] Filed: Jul. 28, 1989

[30] Foreign Application Priority Data

Jul. 29, 1988 [JP] Japan .......................... 63-188062

[51] Int. Cl.5 .............................................. H02H 9/06
[52] U.S. Cl. ..................................... 361/118; 361/120; 361/127
[58] Field of Search ................ 361/117, 118, 119, 120, 361/126, 127

[56] References Cited

U.S. PATENT DOCUMENTS

| 4,658,324 | 4/1987 | Inaba | 361/118 |
| 4,739,436 | 4/1988 | Stefani et al. | 361/127 X |
| 4,924,346 | 5/1990 | Capps | 361/117 |

Primary Examiner—Derek S. Jennings
Attorney, Agent, or Firm—Michael N. Meller

[57] ABSTRACT

A surge absorber utilizes a varistor electrically connected to a surge absorbing element. The varistor voltage and nonlinearity factor are chosen so that the varistor has a preselected voltage-current characteristic which prevents the varistor from breaking down and short circuiting and resulting in a thermal runaway.

5 Claims, 2 Drawing Sheets

SURGE ABSORBER

FIELD OF THE INVENTION

This invention relates to a surge absorber and more specifically to a device composed of a microgap type surge absorbing element and a varistor electrically connected in series with each other.

BACKGROUND OF THE INVENTION

The ZnO varistor is characterized by a quite remarkable nonlinearity of the characteristic voltage-current (V-I) curve. Thus, assuming an equation $I = KV^\alpha$ for the above characteristic curve, the voltage nonlinearity factor $\alpha$ of this type of varistor is mostly in range from 25 to 50, though sometimes even higher than 50. This favorable nonlinearity characteristic has hitherto been used for surge absorption. As a voltage is applied, however, the ZnO varistor, as characterized above, leaks current. Accordingly, if a voltage is continuously applied thereto for a long time, this voltage-current characteristic property will gradually undergo deterioration. This poses the danger that the varistor may break down and short-circuit resulting in a thermal runaway.

A surge absorber composed of a ZnO varistor and a microgap type surge absorbing element electrically connected in series has been proposed by the inventors (Japanese Unexamined Patent Publication No. 58-95933).

This permitted the above ZnO varistor to stay ready to work with a high surge response characteristic of its own while suppressing the aforementioned leak current to a minimum level. This prevents the deterioration thereof and avoids the accompanying danger as mentioned above.

However, the proposed surge absorber uses a ZnO varistor which is characterized by a large voltage nonlinearity factor $\alpha$ and thus selected among those products having a varistor voltage higher than the line voltage.

As mentioned above, the proposed surge absorber uses a ZnO varistor having a varistor voltage higher than the line voltage, so the above surge absorber is characterized by a high firing potential and surge response voltage. This necessarily results in a slow surge response. Accordingly, the previously proposed surge absorber has a low absorbing ability and an insufficient surge absorption capacity for protection of devices.

THE PRESENT INVENTION

A surge absorber incorporating the principles of the present invention has a lower firing potential and a surge response voltage with a faster surge response than previous devices. Further, it has a lower after-surge response residual voltage, as compared to the aforementioned surge absorber. That is the new and improved surge absorber has a superior surge absorbing property.

An object of the invention is to provide a surge absorber characterized by a superior surge absorbing property.

The above surge absorber to which the invention relates includes a microgap type surge absorbing element and varistor electrically connected in series, the above varistor being characterized both by a varistor voltage lower than the line voltage and a voltage nonlinearity factor satisfying an inequality $1 < \alpha < 20$.

BRIEF DESCRIPTION OF THE DRAWINGS

Referring to the drawings, FIG. 1 is an equivalent circuit of a surge absorber 1 composed of a microgap type surge absorbing element 2 and varistor 3 electrically connected in series. Referring to FIG. 2 wherein several possible characteristic V-I curves of varistor 3 are shown, the varistor's voltage nonlinearity factor $\alpha$ as expressed $\alpha = 1/\log_{10}(V_{10\ mA}/V_{1\ mA})$ gives a measure of the slope of V-I curve between 1 mA and 10 mA. The V-I curve "a" of a varistor with a smaller $\alpha$ has a steeper slope than the V-I curve "b" of a larger $\alpha$.

The varistor 3 must be built in the aforementioned surge absorber 1 in such a circuit design that any damage to the microgap type surge absorbing element may be avoided. This requires selection of a varistor that has a varistor voltage ($V_{1\ mA}$) high enough to suppress any follow current. A requirement for such varistor is that the line current $I_L$ as determined by a point where the line voltage $V_L$ crosses the V-I curve "b" must be smaller than the arc maintaining current $I_A$, namely, an inequality $I_L < I_A$ must be satisfied.

The ZnO varistor that has been used in the previously proposed surge absorber has the characteristic V-I curve "b". As long as the inequality $I_L < I_A$ is satisfied, however, no follow current flows. It is therefore possible to use a ZnO varistor that has the characteristic V-I curve "b'" with the varistor voltage $V_O$ lowered down to $V_O'$.

Further, a varistor with a characteristic V-I curve "a" has a steeper slope between 1 mA and 10 mA, namely, a smaller value for the aforementioned parameter $\alpha$ than does a varistor with the characteristic curve "b'". The current $I_L'$ as determined by a point where the line voltage $V_L$ crosses the characteristic V-I curve "a" is smaller than $I_L$, namely, $I_L' < I_L$. The voltage change between $V_{1\ mA}$ and $V_{10\ mA}$ is larger with the curve "a" than with the curve "b". Accordingly, it is possible to move the characteristic V-I curve "a" to the right until it overlaps the curve "a'" with the varistor voltage $V_O'$ of the curve "a" being lowered down to $V_O$.

Figure 1:
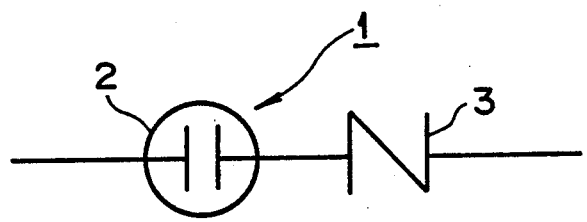
FIG. 1 is an equivalent circuit of a surge absorber embodying the invention.
Figure 2:
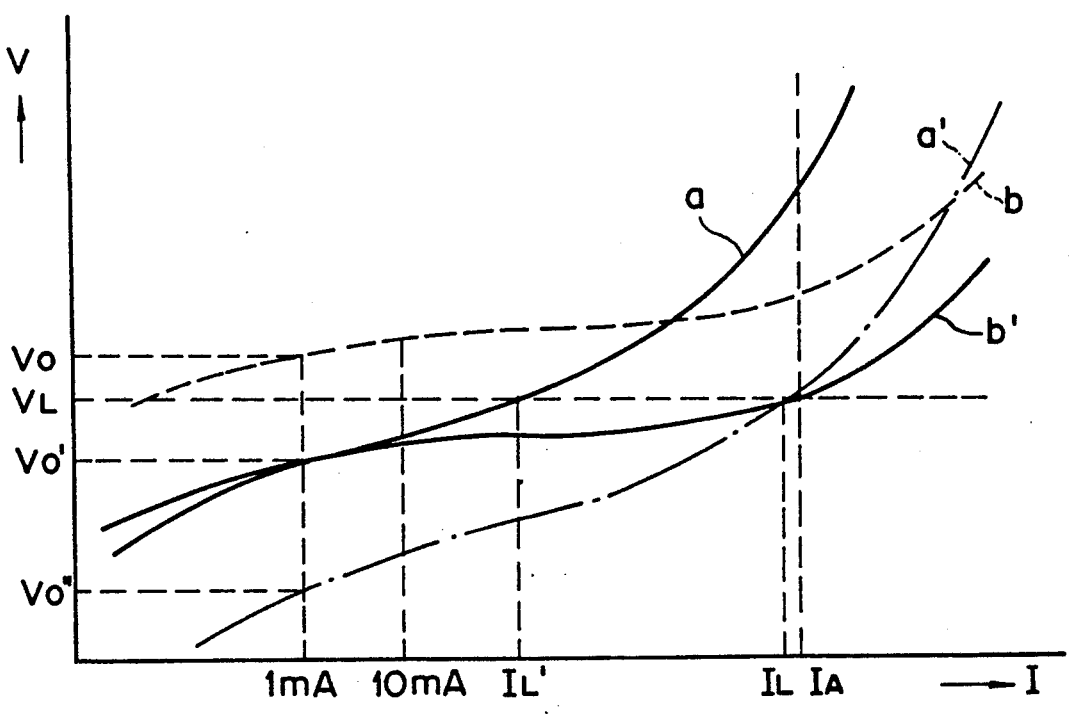
FIG. 2 is a diagram illustrating characteristic voltage-current curves to describe the working mechanism of the surge absorber of the present invention.

In accordance with the principles of the present invention, varistor 3 of FIG. 1 has a varistor voltage lower than the line voltage and a voltage nonlinearity factor $\alpha$ satisfying an inequality $1 < \alpha < 20$ in the surge absorber 1.

A microgap type surge absorbing element as disclosed by the present inventors in the aforementioned Japanese Unexamined Patent Publication 54-95933 and also the Japanese Unexamined Patent Publication 55-128283 may preferably be used as such herein. The above surge absorbing element is a solid circuit element composed of a conductive film formed on the surface of an insulator body with microgaps 10 to 100 $\mu$m in width dividing the conductive film into several parts. An electrode to which a conductor is connected is secured to both end parts of the divided conductive film, the area of the conductive film between these electrodes being enclosed by an insulating material with an inert gas, such as argon, neon, or the like, sealed in. The only requirement for the above element is a firing potential that is higher than the maximum working voltage of a circuit in which the element is built. The discharge start voltage is properly set for the above element selection according to the type, characteristics, etc. of the circuit to be protected.

Any varistor may be used herein as long as the varistor voltage thereof is lower than the line voltage and the voltage nonlinearity factor $\alpha$ thereof satisfies the inequality $1<\alpha<20$, though a varistor is preferably of $TiO_2$, $SrTiO_3$, SiC, or $SnO_2$ type and the factor $\alpha$ thereof is preferably between 5 and 10.

The microgap type surge absorbing element and varistor may be connected by any means as long as a positive electrical connection is established therebetween, though staking, soldering, wiring on a circuit board, etc. may conveniently be used.

To stabilize the shape of the surge absorber of this invention, the entire assembly thereof is preferably covered with an insulator casing, coating material, heat-shrinkable tube, or like with or without being charged with a filling material.

The surge absorber incorporating the principles of the present invention can be built in a large variety of electrical devices, instruments and equipment, being favorably used particularly in those having power lines, disposed between these lines or one of these lines and ground.

EXAMPLES

The invention will be more clearly understood with reference to the following embodiments or examples:

EXAMPLE 1

Figure 3:
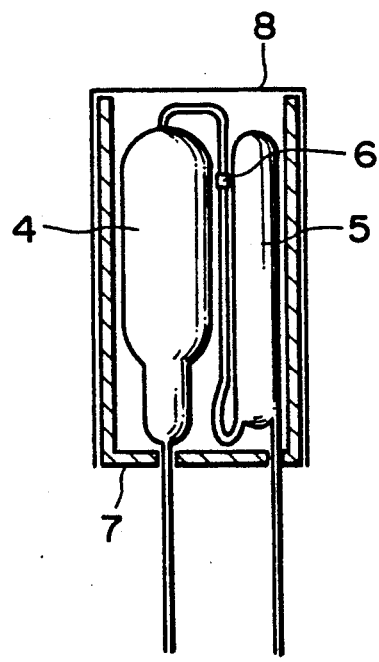
FIGS. 3 and 4 are vertical cross-sections of surge absorbers used in different embodiments.

FIG. 3 is a vertical cross-section of a surge absorber composed of a surge absorbing element 4 and a varistor 5 electrically connected in series by staking 6, both accommodated inside of a cylindrical insulating cup 7 covered with a heat shrinkable tube 8. Surge voltages were applied to the surge absorber as constructed above for an experiment as follows.

A $SrTiO_3$ varistor with $\alpha=10$ and varistor voltage$=20$ V was used with a surge waveform of $(1.2\times50)$ $\mu sec - 5$ kV.

For control, the same experiment was repeated using a ZnO varistor with $\alpha=60$ and varistor voltage$=220$ V instead of the above varistor.

Tables 1 and 2 are the experimental conditions and results, respectively.

TABLE 1

| | Line voltage | Firing Potential of surge absorbing element | Varistor's Nonlinearity factor $\alpha$ | Varistor voltage |
|---|---|---|---|---|
| Ex. 1 | 120 VAC | 300 V | 10 | 20 |
| Cont. 1 | 120 VAC | 300 V | 60 | 220 |

TABLE 2

| | firing potential | Surge response voltage | After-surge residual voltage |
|---|---|---|---|
| Ex. 1 | 320 V | 510 V | 200 V |
| Cont. 1 | 520 V | 750 V | 450 V |

The results as given in Table 2 indicate remarkable reductions in the firing potential, surge response voltage and after-surge response residual voltage with Example 1 as compared to Control 1.

EXAMPLE 2

Figure 4:
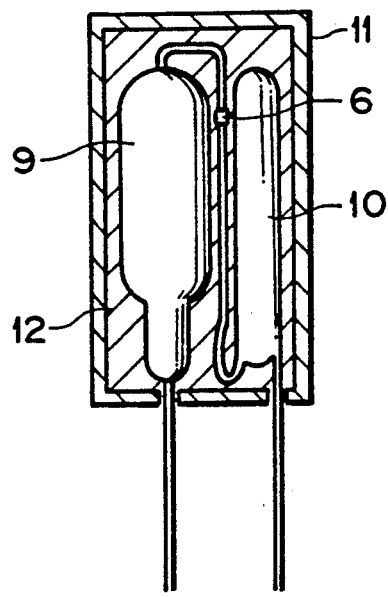

FIG. 4 is a vertical cross-section of another surge absorber composed of a surge absorbing element 9 and varistor 10 electrically connected in series by staking 6, both accommodated inside of a cylindrical insulating casing 11 charged with an insulating filler 12. Using the above surge absorber, the same experiment in Example 1 was repeated.

In this Example, a $TiO_2$ varistor with $\alpha=8$ and varistor voltage$=50$ V was used, which was replaced with a ZnO varistor with $\alpha=70$ and varistor voltage$=470$ V for a control experiment.

Tables 3 and 4 are the experimental conditions and results, respectively.

TABLE 3

| | Line voltage | Firing Potential of surge absorbing element | Varistor's Nonlinearity factor $\alpha$ | Varistor voltage |
|---|---|---|---|---|
| Ex. 2 | 240 VAC | 500 V | 8 | 50 |
| Cont. 2 | 240 VAC | 500 V | 70 | 470 |

TABLE 4

| | firing potential | Surge response voltage | After-surge residual voltage |
|---|---|---|---|
| Ex. 2 | 550 V | 870 V | 280 V |
| Cont. 2 | 970 V | 1400 V | 600 V |

The results as given in Table 4 indicate remarkable reductions in the firing potential, surge response voltage and after-surge response residual voltage with Example 2 as compared to Control 2.

As obviously understood from the above description, this invention provides a surge absorber that is characterized by low firing potential, surge response voltage and after-surge response residual voltage, which means a fast surge response and high surge absorption capacity.

What is claimed is:

1. A surge absorber composed of a microgap type surge absorbing element and a varistor, each of said surge absorbing element and said varistor being arranged as a structural element physically separate from the other, said separate surge absorbing element and said varistor being electrically connected in series with each other, said varistor having a varistor voltage lower than a predetermined line voltage and having a voltage nonlinearity factor $\alpha$ between 1 and 20.

2. A surge absorber as claimed in claim 1 wherein said varistor is of a type selected from the group including $TiO_2$, $SrTiO_3$, SiC, or $SnO_2$.

3. A surge absorber as claimed in claim 2 wherein said varistor has a voltage nonlinearity factor $\alpha$ between 5 and 10.

4. A surge absorber composed of a microgap type surge absorbing element and a varistor electrically connected in series with each other wherein said varistor has a varistor voltage lower than a predetermined line voltage and wherein said varistor is a $SrTiO_3$) varistor having a voltage nonlinearity factor $\alpha=10$.

5. A surge absorber as claimed in claim 1 wherein said varistor is a $TiO_2$ varistor having a voltage nonlinearity factor $\alpha=8$.

* * * * *